UNITED STATES PATENT OFFICE.

WILHELM BAUER, OF VOHWINKEL, AND ALFRED HERRE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

961,396.  Specification of Letters Patent.  Patented June 14, 1910.

No Drawing.  Application filed September 8, 1909.  Serial No. 516,686.

*To all whom it may concern:*

Be it known that we, WILHELM BAUER and ALFRED HERRE, doctors of philosophy, chemists, citizens of the German Empire, residing at, respectively, Vohwinkel and Elberfeld, Germany, have invented new and useful Improvements in Vat Dyes, of which the following is a specification.

Our invention relates to the manufacture and production of new and valuable vat dyestuffs. They are obtained by condensing isatin derivatives in which the oxygen of the alpha-keto group is replaced by easily movable or replaceable substituents, e. g. halogen, sulfur, the amino group, the alkoxy group, with anthrol compounds, especially 1-anthrol and its substituted derivatives having a free ortho position to the hydroxy group.

The new dyes are in a dry state dark blue crystalline powders with a metallic luster which are soluble in hot nitrobenzene generally with a blue coloration, and which yield with hydrosulfite and caustic soda lye vats dyeing cotton after exposure to air blue shades remarkable for their fastness to chlorin.

In order to illustrate the new process more fully we can proceed as follows, the parts being by weight:—

Example 1: 14.7 parts of isatin are converted in a dry benzene suspension into isatin chlorid by heating it with 21 parts of $PCl_5$. The mixture thus obtained is then added to a warm solution, which is well stirred, of 20 parts of 1-anthrol in dry benzene. After cooling the dye is filtered off and washed with benzene and ether. It is a dark blue powder soluble in cold concentrated sulfuric acid with an olive-green and in hot concentrated sulfuric acid with a greenish-blue color. It forms a vat with hydrosulfite and caustic alkali, from which cotton is dyed after exposure to air in reddish-blue shades.

Example 2: A mixture of 25 parts of para-methylisatin-alpha-para-toluidid, 20 parts of 1-anthrol and 100 parts of acetic acid anhydrid is heated on the water-bath until the formation of the dye is complete. The dye which separates in crystals is filtered off and washed. It crystallizes in blue needles with a copper luster and is soluble in cold concentrated sulfuric acid with a bluish-green color. It dyes cotton from a hydrosulfite vat after exposure to air deep greenish-blue shades.

Example 3: 100 parts of dibromoisatin are converted in a dry benzene suspension into dibromoisatin chlorid by heating it with 72 parts of $PCl_5$. The mixture thus obtained is then poured into a solution which is well stirred of 70 parts of 1-anthrol in dry benzene. The stirring is continued for a short time and the dye which separates on cooling is filtered off and washed. It is a dark blue crystalline powder with a copper luster scarcely soluble in hot benzene with a greenish-blue and in concentrated sulfuric acid with an olive color. It yields with hydrosulfite and NaOH an orange-yellow vat from which cotton is dyed orange-yellow changing on exposure to air into a fast deep greenish-blue fast to chlorin.

Other anthrol derivatives may be used, e. g. 1.5- and 1.8-dioxyanthracene; and instead of the above isatin derivatives others may be used, e. g. chloro-, bromo-, chlorobromo- or dichloroisatin chlorid, orthobromo-para-methyl-isatin chlorid, tri-bromo-isatin chlorid, ortho-methylisatin chlorid, ortho-para-dimethylisatin chlorid, para-bromo-ortho-methlyisatin chlorid etc. etc.

We claim:—

1. The herein-described new dyestuffs obtainable from an isatin derivative in which the oxygen of the alpha-keto group is replaced by easily movable or replaceable substituents and a hereinbefore defined 1-anthrol compound, which dyestuffs are in a dry state dark blue crystalline powders with a metallic luster which are soluble in hot nitrobenzene generally with a blue coloration, and which yield with hydrosulfite and caustic soda lye vats dyeing cotton after exposure to air blue shades remarkable for their fastness to chlorin, substantially as described.

2. The herein-described new dyestuff obtainable from dibromoisatin-alpha-chlorid and 1-anthrol, which dyestuff is in a dry state a dark blue crystalline powder with a copper luster, scarcely soluble in hot benzene with a greenish-blue and in concentrated sulfuric acid with an olive color, and which yields with hydrosulfite and caustic soda lye an orange yellow vat from which cotton is dyed orange-yellow changing on exposure to air into a deep greenish-blue remarkable for its fastness to chlorin, substantially as described.

In testimony whereof we have hereunto set our hands in the presence of two subscribing witnesses.

WILHELM BAUER. [L. S.]
ALFRED HERRE. [L. S.]

Witnesses:
OTTO KÖNIG,
WILLY KLEIN.